US012811300B2

(12) United States Patent
Obermayer

(10) Patent No.: US 12,811,300 B2
(45) Date of Patent: Nov. 24, 2026

(54) FEEDING STRUCTURE FOR A DUAL POLARIZED RADIATOR

(71) Applicant: Telefonaktiebolaget LM Ericsson (publ), Stockholm (SE)

(72) Inventor: Maximilian Obermayer, Rosenheim (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 19/121,390

(22) PCT Filed: Nov. 14, 2022

(86) PCT No.: PCT/EP2022/081853
§ 371 (c)(1),
(2) Date: Apr. 15, 2025

(87) PCT Pub. No.: WO2024/104558
PCT Pub. Date: May 23, 2024

(65) Prior Publication Data
US 2026/0180188 A1 Jun. 25, 2026

(51) Int. Cl.
*H01Q 9/42* (2006.01)
*H01Q 9/28* (2006.01)
*H01Q 21/24* (2006.01)

(52) U.S. Cl.
CPC ............... *H01Q 9/42* (2013.01); *H01Q 9/285* (2013.01); *H01Q 21/24* (2013.01)

(58) Field of Classification Search
CPC ........... H01Q 9/42; H01Q 9/285; H01Q 21/24
See application file for complete search history.

(56) References Cited

U.S. PATENT DOCUMENTS 6,072,439 A 6/2000 Ippolito et al.
7,109,821 B2 9/2006 Engargiola
2007/0205952 A1 9/2007 Deng et al.
2015/0070234 A1* 3/2015 Jones ..................... H01Q 21/28 343/797
2024/0421500 A1* 12/2024 Li .......................... H01Q 1/246

FOREIGN PATENT DOCUMENTS

CN 108511913 A 9/2018
WO 2018224666 A1 12/2018

OTHER PUBLICATIONS

Saurav, et al., "A Two-Port Dual-Polarized Ring Antenna for Massive MIMO," European Conference on Antennas and Propagation, Apil 9-13, 2018, Stevenage, United Kingdom, 4 pages.
International Search Report and Written Opinion for International Patent Application No. PCT/EP2022/081853, mailed Jun. 20, 2023, 15 pages.

* cited by examiner

*Primary Examiner* — Dieu Hien T Duong
(74) *Attorney, Agent, or Firm* — Withrow & Terranova, PLLC

(57) ABSTRACT

A feeding structure for a dual polarized radiator, a dual polarized radiator, particularly for a base station antenna and to a base station. The feeding structure comprises a first pair of balanced conductor elements being connected to a first radiator of a dual polarized radiator and a second pair of balanced conductor elements being connected to a second radiator of the dual polarized radiator.

20 Claims, 6 Drawing Sheets

FEEDING STRUCTURE FOR A DUAL POLARIZED RADIATOR

This application is a 35 U.S.C. § 371 national phase filing of International Application No. PCT/EP2022/081853, filed Nov. 14, 2022, the disclosure of which is incorporated herein by reference in its entirety.

FIELD OF THE INVENTION

The invention relates to a feeding structure for a dual polarized radiator, particularly for a base station antenna, a dual polarized radiator and a base station for mobile communication.

BACKGROUND

Base station antennas used for wireless communication base stations are typically composed of multiple radiators so as to enable radio frequency cellular communication with an improved transmission range and/or with distinct frequency bands. These base station antennas may include up to three different interleaved and/or overlapping radiators, e.g. one in the frequency range from 698-969 MHz, one from 1427-2690 MHz and one from 3300-4200 MHz. Different radiators for different frequency bands are e.g. arranged in an interleaved or stacked manner over a reflector. Due to the different frequency bands used, interference and undesired coupling is critical. Further, such radiators may be formed as dual polarized radiators, such as dual polarized dipole radiators, which include two radiator arms (respectively dipole arms), each radiator arm requiring a respective feeding structure.

These feeding structures may be realized on a printed circuit board (PCB) or in sheet metal. In order to provide a respective feed line for both dipole arms, the feed structure is commonly formed of two (PCB) parts that are positioned such that the respective feed lines are in an orthogonal arrangement to each other. Examples of such feed structures are described e.g. in U.S. Pat. No. 6,072,439 and WO 2018/224666 A1. A symmetrical feeding arrangement for a casted dipole arrangement is known from CN108511913 A1.

As two parts, respectively PCBs, are used to build up the feeding structure, costs of known feedings structures are relatively high. Further, those known feeding structures have a relatively large foot print and a relatively high weight.

Hence, the object of the present disclosure is to provide an improved dual polarized radiator, and particularly an improved feeding structure for a dual polarized radiator.

SUMMARY

The object is achieved by a feeding structure, a dual polarized radiator and a base station. Further aspects of the present disclosure are given in the dependent claims.

In particular, the object is achieved by a feeding structure for a dual polarized radiator, particularly for a base station antenna and accordingly for a base station. The feeding structure comprises a first conductive plane and a second conductive plane. Those planes are arranged substantially parallel to each other, e.g. as conductive layers of a PCB. It is to be understood, that the conductive planes are planes including conductor elements. They only have to be arranged (at least par-tially) in said conductive plane. Further, at least one of the conductive planes may be provided as a sheet metal, being oriented substantially parallel to the further plane.

The feeding structure further comprises a first pair of balanced conductor elements and a second pair of balanced conductor elements. Each of the balanced conductor elements of the first pair includes a head end and a foot end being opposed to the respective head end. Accordingly, each of the balanced conductor elements of the second pair includes a head end and a foot end being opposed to the respective head end.

The first pair of balanced conductor elements is adapted to being galvanically connected to a first radiator of a dual polarized radiator at the respective head ends of the balanced conductor elements of the first pair. The second pair of balanced conductor elements is adapted to being galvanically connected to a second radiator of the dual polarized radiator at the respective head ends of the balanced conductor elements of the second pair.

Each of the first and second pairs of balanced conductor elements provides a balanced output. The respective balanced conductor elements can be galvanically connected to corresponding arms (e.g. dipole arms) of radiators of the dual polarized radiator. The galvanic connection may be achieved by soldering (e.g. by a selective wave soldering method), welding (e.g. spot-welding), electrical plug connections, and/or the like. Particularly, the head ends of the balanced conductor elements may be adapted to be soldered, welded or plugged to respective radiators.

A first balanced conductor element of the first pair of balanced conductor elements is arranged on the first conductive plane and a second balanced conductor element of the first pair of balanced conductor elements is arranged on the second conductive plane, so as to be broadside coupled with the first balanced conductor element of the first pair of balanced conductor elements.

Further, a first balanced conductor element of the second pair of balanced conductor elements is arranged on the first conductive plane and a second balanced conductor element of the second pair of balanced conductor elements is arranged on the second conductive plane, so as to be broadside coupled with the first balanced conductor element of the second pair of balanced conductor elements.

Accordingly, the first pair of balanced conductor elements forms a differential pair of signal lines (e.g. PCB traces) that are routed to the respective radiator arms of a first radiator of the dual polarized radiator and operates therefore in the broadside coupled range as a symmetrical parallel plate transmission line. Likewise, the second pair of balanced conductor elements forms a further differential pair of signal lines (e.g. PCB traces) that are routed to the respective radiator arms of a second radiator of the dual polarized radiator.

The feeding structure can be provided with a significantly reduced footprint and weight compared to conventional feeding structures, as the first and second pairs of balanced conductor elements are not provided in an orthogonal orientation. Further, the feeding structure can be arranged on a single base part, e.g. a PCB. Thus, costs can be reduced compared to conventional feeding structures using e.g. two PCBs.

Further, it has surprisingly shown, that the feeding structure shows an improved behavior against common mode resonance and allows filtering out undesired coupling to high frequency bands. Hence, transparency is increased and undesired interference and coupling of radiators of different frequency bands can be reduced. Still further, the feeding structure allows to arrange the radiators freely above a reflector, if being used. Thus, the height of the radiators above the reflector can be freely chosen, allowing for increased design flexibility.

The first balanced conductor element of the first pair of balanced conductor elements may be arranged next to the first balanced conductor element of the second pair of balanced conductor elements. Optionally, the first balanced conductor element of the first pair of balanced conductor elements runs parallel to the first balanced conductor element of the second pair of balanced conductor elements, at least in a certain section. Accordingly, the second balanced conductor element of the first pair of balanced conductor elements may be arranged next to the second balanced conductor element of the second pair of balanced conductor elements. Optionally, the second balanced conductor element of the first pair of balanced conductor elements runs parallel to the second balanced conductor element of the second pair of balanced conductor elements, at least in a certain section.

For example, the balanced conductor elements of the respective pairs may be routed in parallel in a section that is at least 90% of the length of the feeding structure, or at least 80% of the length of the feeding structure, at least 70% of the length of the feeding structure. The first and second conductive elements of each pair may be arranged on the respective conductive planes, to achieve broadside coupling at least in those sections. Thus, a high signal quality can be achieved.

As explained above, at least one of the first and/or second conductive planes may be a conductive plane of a PCB. Particularly, the first and second conductive planes may be conductive planes of the same PCB. This allows for a feeding structure with a very small foot print. For example, the PCB may have a width of about 15 mm and a thickness of about 1 mm. Further, using a PCB allows for a high insu-lation between the respective balanced conductor elements for both polarizations and therefore, a high signal quality can be achieved.

Further at least one of the first and/or second conductive planes may be a sheet metal plane. Particularly, at least one of the balanced conductor elements may be formed as sheet metal part(s). In this case, at least one balanced conductor element of the balanced conductor elements may be integrally formed by a stamped and/or bended metal sheet part, or by multiple metal sheet parts (e.g. 2 parts, 3 parts, . . . ) being fixed to each other (e.g. by pins, rivets, screws, soldering, welding, and/or the like).

The first and second conductive planes may sandwich an insulator layer, wherein the first and second conductive planes may fixedly be adhered to the insulator layer. Thus, a rigid and reliable feeding structure can be provided.

Further, the conductor elements of the first pair and/or the second pair may include a meander symmetrical line, or may be a meander symmetrical lines. Particularly, at least one conductor elements of the first pair and a conductor element of the second pair arrange next to said conductor element may have an opposing meander shape. A meander symmetrical line is a conductive trace forming a continuous line, shaped into a repeated motif. Hence, the length of the line is increased, compared to a straight running line. This allows e.g. adapting the phase shift between the lines of a differential signal pair. Further, losses, transparency of the structure and radiation characteristics can be easily adapted and improved.

For connecting the feeding structure to the respective radiators, the head ends of the balanced conductor elements may be provided on the same side of a dual polarized radiator to be fed. Particularly, the head ends of the balanced conductor elements may be arranged on a side of a dual polarized radiator that faces away from the foot ends of the balanced conductor elements. Hence, all head ends of the balanced conductor elements would be provided on an upper side of the dual polarized radiator allowing for an improved access to the respective head ends. Accordingly, connecting is facilitated and can e.g. done by using a selective wave soldering method.

In an alternative aspect, the head ends of the balanced conductor elements of the first pair may be provided on a first side of a dual polarized radiator to be fed, and the head ends of the balanced conductor elements of the second pair may be provided on a second side of a dual polarized radiator to be fed, opposing the first side. This arrangement facilitates the routing of the conductor elements, as only two of the conductor elements have to be routed on an upper side of the dual polarized radiator.

Moreover, the head end of the first balanced conductor element of the first pair of balanced conductor elements may include at least one via, connecting the first balanced conductor element with a corresponding connection pad arranged on the second conductive plane. The corresponding connection pad serves for galvanically connecting the head end to a first radiator arm of the first radiator. Accordingly, the head end of the second balanced conductor element of the first pair of balanced conductor elements may include at least one via, connecting the second balanced conductor element with a further corresponding connection pad arranged on the first conductive plane. This further corresponding connection pad serves for galvanically connecting the respective head end to a second radiator arm of the first radiator.

With providing a via/vias opposing arms of radiators can be easily connected, as the gap formed between these arms can be bridged by the via(s). In a particular example, the gap between two radiator arms of a radiator of a dual polarized radiator may be about the thickness of a PCB providing the feeding structure. The first conductive plane may be arranged on a first side of said PCB and the second conductive plane may be arranged on a second, opposing side of said PCB.

In a particular example, the first balanced conductor element of the first pair may include at least one via for connecting the first balanced conductor element of the first pair to a first arm of a first radiator of a dual polarized radiator. Further, the second balanced conductor element of the first pair may also include at least one via for connecting the second balanced conductor element of the first pair to a second arm of the first radiator of the dual polarized radiator. Further, the first balanced conductor element of the second pair may include no via (at least at the head end thereof) and may be directly connected to a first arm of a second radiator of the dual polarized radiator, and the second balanced conductor element of the second pair may also include no via (at least at the head end thereof) any may be directly connected to a second arm of the second radiator of the dual polarized radiator. Hence, the gap between the radiator arms can be bridged using a via/vias, allowing for a small footprint of the feeding structure. Likewise, the second pair may be connected to a second radiator.

Further, at least one via, and optionally all vias assigned to the balanced conductor elements (respectively the head ends thereof) may be arranged on a side of the dual polarized radiator to be fed, that faces away from the foot ends of the balanced conductor elements. Thus, the via(s) are provided on an upper side of the radiator. Hence, almost over the entire length of the feeding structure the balanced conductor elements of the respective pairs can be routed in a broadside coupled manner.

The head end of the first balanced conductor element of the first pair of balanced conductor elements may be routed above the head end of the first balanced conductor element of the second pair of balanced conductor elements. This arrangement allows connecting the radiators of the dual polarized radiator with the feeding structure without the need of vias. Hence, costs can be reduced.

The feeding structure may further comprise a base plate, such as a base PCB. The base plate signal lines that can be galvanically connected to respective ones of the foot ends of the balanced conductor elements. Accordingly, the balanced conductor elements may be directly soldered, welded or plugged to the base plate, allowing for a further size reduction.

The feeding structure may further include at least one balancing unit and/or an RF choke for providing a balanced signal to the first and/or second pair (of balanced conductor elements. The at least one balancing unit and/or RF choke may be arranged on the base plate and/or the PCB carrying the balanced conductor elements. The balancing unit and/or the RF choke transforms the applied unbalanced signal of a distribution network of an antenna array to a balanced input.

Generally, a balancing unit (balun) is an electrical device that allows balanced and unbalanced lines to be interfaced without disturbing the impedance arrangement of either line. In other words, a balancing unit may be assigned to each one of the pairs of balanced conductor elements and transforms an unbalanced input signal to a balanced input signal, that is then transferred by the balanced conductor elements to the respective radiator.

As a possible balancing unit, a delay line balun or other balun implementations may be used. For example, a transformer type balun, including separate wind-ings provided on a transformer core may be used. Likewise, an autotransformer type balun can be used. Further, a transmission-line transformer type balun (also denoted as choke balun) may be used. With arranging the balancing unit on the base plate or the PCB carrying the balanced conductor elements, the footprint of the feeding structure can be further reduced.

The feeding structure may further include a reflector. Particularly, the reflector may be integrally formed with the base plate, e.g. as a continuous metallization layer of a PCB acting as base plate.

In a further aspect, the first and/or second pair of balanced conductor elements may penetrate the reflector, so that the respective foot ends and head ends are arranged on opposing sides of the reflector. Particularly, the reflector may include a through opening for receiving the first and/or second pair of balanced conductor elements. Thus, the base plate and respective signal lines or further electric components, such as a balancing unit, can be hidden from the radiator and the transparency of the feeding structure can be increased.

The object is further achieved by a dual polarized radiator including a feeding structure as described above. The dual polarized radiator further includes a first radiator, particularly a first dipole, and a second radiator, particularly a second dipole, wherein the first radiator is galvanically connected to the first pair of balanced conductor elements and wherein the second radiator is galvanically connected to the second pair of balanced conductor elements.

The dual polarized radiator, particularly the first and second radiators may be PCB radiators or sheet metal radiators. PCB radiators are radiators formed on a PCB. Those PCB radiators allow for a cost efficient, precise and highly automated man-ufacturing. Further, a small footprint can be provided. Sheet metal radiators can be more reliable as they are generally less prone to undesired flexing.

The first radiator may have a first radiator arm and a second radiator arm and the second radiator may have a first radiator arm and a second radiator arm, wherein the feeding structure may be centered between the first radiator arm and the second radiator arm of the first radiator and/or between the first radiator arm and the second radiator arm of the second radiator. This allows for an advantageously symmetric setup. Particularly, the first radiator arm and the second radiator arm of the first radiator and the first radiator arm and the second radiator arm of the second radiator may be in crossed arrangement relative to each other. Further, the first and or second radiator may be a linear polarized dipole, or can form a circular polarized radiator.

The object is further achieved by a base station antenna for wireless communication. The base station antenna includes at least one dual polarized radiator described above. Optionally, the base station antenna may include a phase shifter for adapting the beam direction of the base station antenna. Further, the base station antenna may be an active antenna.

BRIEF DESCRIPTION OF THE FIGURES

The present disclosure will be more readily appreciated by reference to the following detailed description when being considered in connection with the accompanying drawings in which.

DETAILED DESCRIPTION OF THE FIGURES

Figure 1:
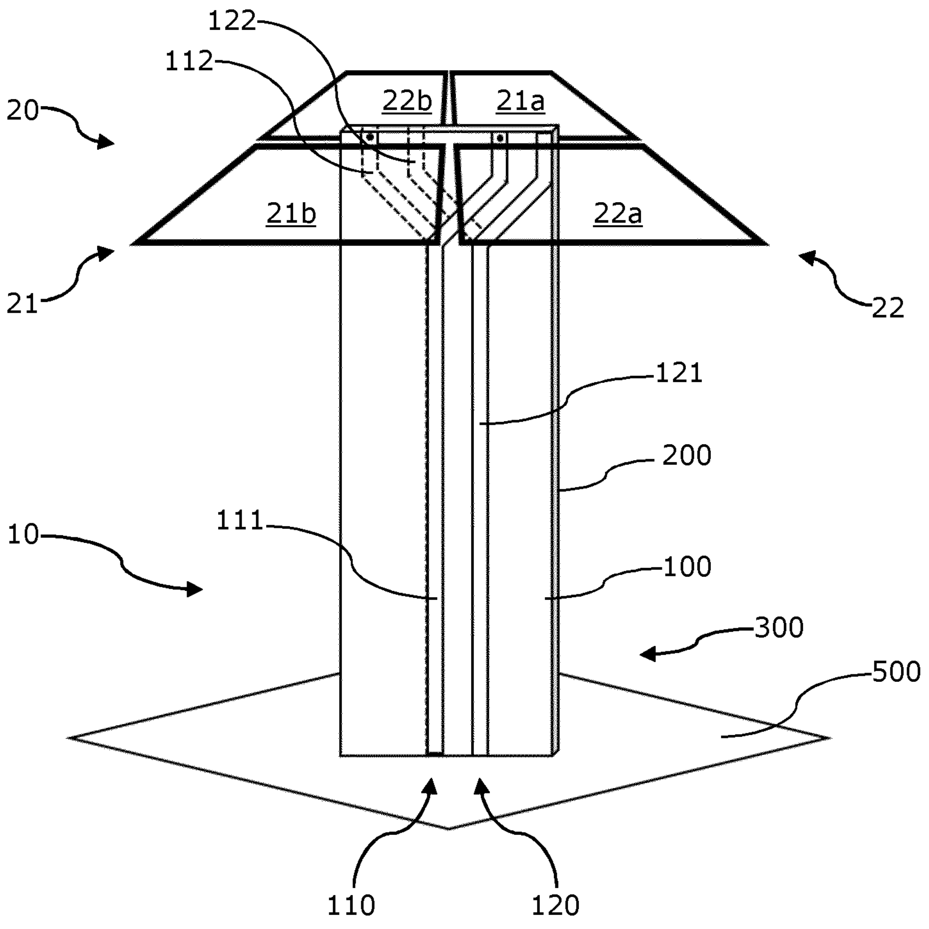
FIG. 1 shows a schematic illustration of a dual polarized radiator, including a feeding structure.

FIG. 1 shows a schematic illustration of a dual polarized radiator 20, including a feeding structure 10.

The dual polarized radiator 20 includes a first radiator 21, being a dipole having a first radiator arm 21*a* and a second radiator arm 21*b*. Further, the dual polarized radiator 20 includes a second radiator 22, being a dipole having a first radiator arm 22*a* and a second radiator arm 22*b*. Here, the first and second radiators 21, 22 are PCB radiators being arranged on a PCB. It is to be understood, that the radiators could also be formed of e.g. sheet metal.

The first radiator arm 21*a* and a second radiator arm 21*b* of the first radiator 21 as well as the first radiator arm 22*a* and a second radiator arm 22*b* of the second radiator 22 are in crossed arrangement relative to each other.

Figure 2A:
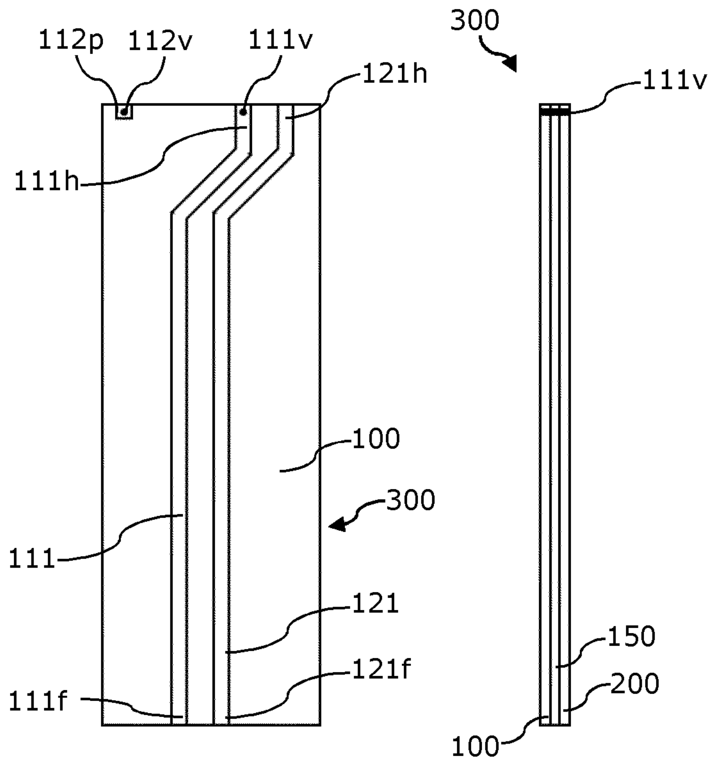
FIG. 2A shows a schematic illustration of the feeding structure shown in FIG. 1, in three different orientations.

The feeding structure, which is shown in more detail in FIG. 2A is centered between the first radiator arm 21*a* and the second radiator arm 21*b* of the first radiator 21 and between the first radiator arm 22*a* and the second radiator arm 22*b* of the second radiator 22. Accordingly, a very symmetric setup is achieved.

The feeding structure 10 includes a first conductive plane 100 and a second conductive plane 200. The first and second conductive planes 100, 200 are oriented substantially parallel to each other and are conductive planes of the same PCB 300. The first and second conductive planes 100, 200 are separated by an insulating layer 150 of the PCB 300.

The feeding structure 10 further includes a first pair 110 of balanced conductor elements 111, 112 and a second pair 120 of balanced conductor elements 121, 122. Those balanced conductor elements 111, 112 121, 122 being formed as traces on PCB 300.

A first balanced conductor element 111 of the first pair 110 of balanced conductor elements 111, 112 is arranged on the first conductive plane 100 and a second balanced conductor element 112 of the first pair 110 of balanced conductor elements 111, 112 is arranged on the second conductive plane 200. This a second balanced conductor element 112 is depicted with hashed lines. The first and second conductor elements 111, 112 are broadside coupled. Further, a first balanced conductor element 121 of the second pair 120 of balanced conductor elements 121, 122 is arranged on the first conductive plane 100 and a second balanced conductor element 122 of the second pair 120 of balanced conductor elements 121, 122 is arranged on the second conductive plane 200, so as to be broadside coupled with the first balanced conductor element 121 of the second pair 120 of balanced conductor elements 121, 122.

The first pair 110 of balanced conductor elements 111, 112 is galvanically connected (e.g. soldered) to the first radiator 21 of the dual polarized radiator 20 and the second pair 120 of balanced conductor elements 121, 122 is galvanically connected (e.g. soldered) to the second radiator 22 of the dual polarized radiator.

Further, the first balanced conductor element 111 of the first pair 110 of balanced conductor elements 111, 112 is arranged next to the first balanced conductor element 121 of the second pair 120 of balanced conductor elements 121, 122 and runs parallel to the first balanced conductor element 121 of the second pair 120 of balanced conductor elements.

Further, a base plate 500, being a base PCB, is provided. The base PCB 500 includes signal lines (cf. FIG. 4) that are galvanically connected to respective ones of the balanced conductor elements.

FIG. 2A gives a schematic illustration of the feeding structure shown in FIG. 1, in three different orientations. On the left side, a front view of the feeding structure is shown. In the middle, a side view is given and on the right side, the back view of the feeding structure is shown.

The feeding structure 10 is provided on a single PCB 300, having first and second conductive planes 100, 200. The first conductive plane 100 is shown in the front view and the second conductive plane 200 in the back view. On the first conductive plane 100 two traces are provided, that extend longitudinally and have in the upper portion a slanted routing. The traces form first ones of conductor elements 111, 121 of the first and second pairs 110, 120. Accordingly, on the second conductive plane 200 two traces are provided, that extend longitudinally and have in the upper portion a slanted routing. These traces form second ones of conductor elements 112, 122 of the first and second pairs 110, 120.

Each of the balanced conductor elements 111, 112; 121, 122 of the first pair 110 and the second pair 120 includes a respective head end 111*h*, 112*h*; 121*h*, 122*h* and a foot end 111*f*, 112*f*; 121*f*, 122*f*, being opposed to the respective head end 111*h*, 112*h*; 121*h*, 122*h*.

Figure 2B:
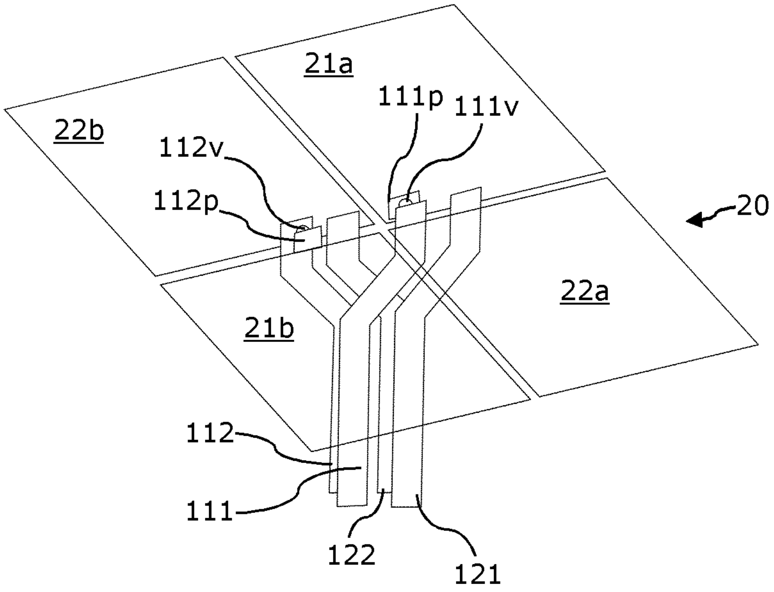
FIG. 2B shows details of the feeding structure of FIG. 1.

The head end 111*h* of the first balanced conductor element 111 of the first pair 110 of balanced conductor elements includes at least one via 111*v*, as best seen in FIG. 2B. The via 111*v* connects the first balanced conductor element 111 with a corresponding connection pad 111*p* arranged on the second conductive plane 200. The connection pad 111*p* serves for galvanically connecting the head end 111*h* to the first radiator arm 21*a* of the first radiator 21 (cf. FIG. 1). The head end 112*h* of the second balanced conductor element 112 of the first pair 110 of balanced conductor elements includes also at least one via 112*v*. The via 112*v* connects the second balanced conductor element 112 with a corresponding connection pad 112*p* arranged on the first conductive plane 100. This connection pad 112*p* serves for galvanically connecting the head end 112*h* to the second radiator arm 21*b* of the first radiator 21.

The first balanced conductor element 121 of the second pair 120 includes no via (at least at the head end thereof) and is directly connected to a first arm 22*a* of the second radiator of the dual polarized radiator. Likewise, the second balanced conductor element 122 of the second pair 120 includes no via (at least at the head end thereof) and is directly connected to a second arm 22*b* of the second radiator 22 of the dual polarized radiator 20. With providing a via/vias 111*v*, 112*v*, the opposing arms 21*a*, 21*b* of the first radiator 21 can be easily connected, as the gap formed between these arms 21*a*, 21*b* can be bridged by the via(s).

As shown in FIG. 2B, the head ends 111*h*, 112*h* of the balanced conductor elements 111, 112 of the first pair 110 and the balanced conductor elements 121, 122 of the second pair 120 are provided on the same side of the dual polarized radiator 20, namely on a side that faces away from the foot ends 111*f*, 112*f*; 121*f*, 122*f* of the balanced conductor elements 111, 112; 121, 122. This facilitates soldering the head ends 111*h*, 112*h*; 121*h*, 122*h* to the respective arms 21*a*, 21*b*, 22*a*, 22*b* of the dual polarized radiator 20.

Figure 3A:
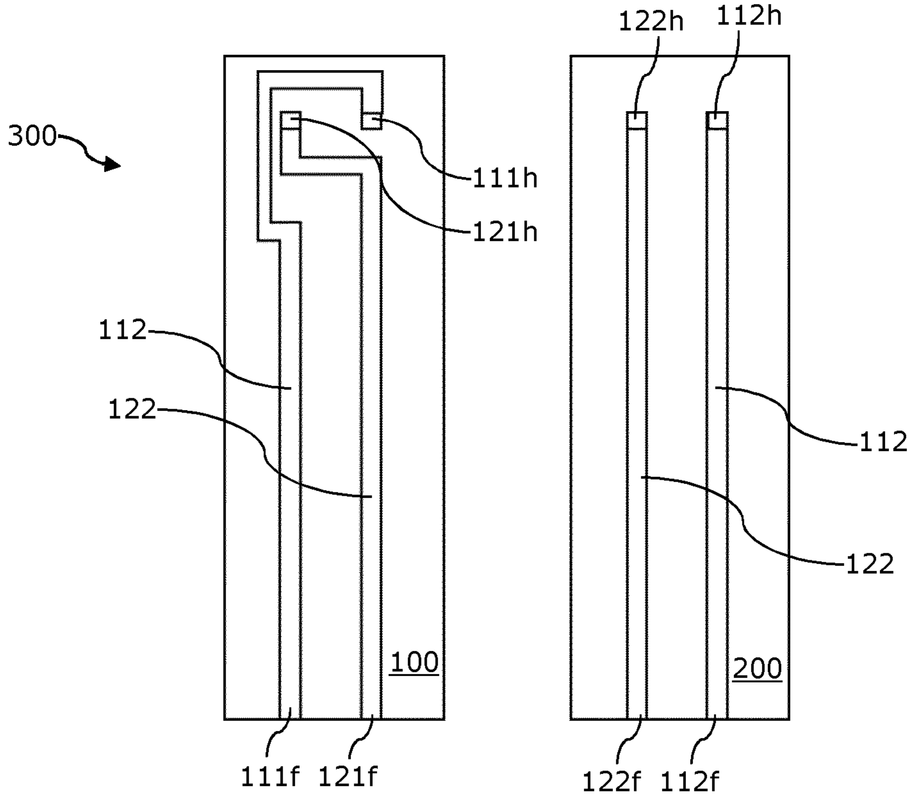
FIG. 3A shows a schematic illustration of a further feeding structure, in two different orientations.
Figure 3B:
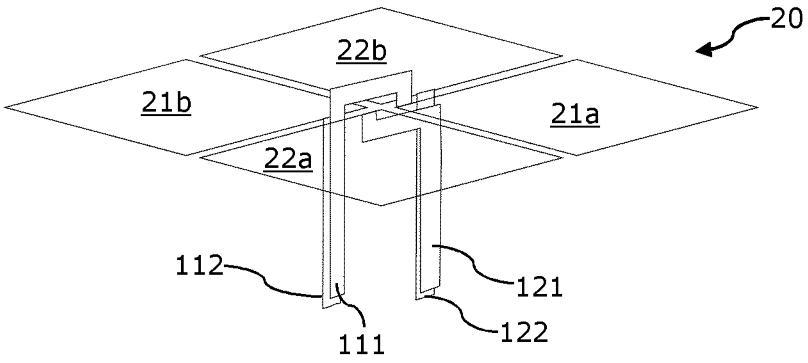
FIG. 3B shows details of the feeding structure of FIG. 3A.

FIG. 3A shows a schematic illustration of a further feeding structure, in two different orientations. On the left side, a front view of the feeding structure is shown and on the right side, the back view of the feeding structure is shown. FIG. 3B shows details how the feeding structure of FIG. 3A is connected the arms 21*a*, 21*b*, 22*a*, 22*b* of a dual polarized radiator.

As the feeding structure shown in FIGS. 1 to 2B, the feeding structure 10 of FIGS. 3A and 3B is provided on a single PCB 300, having first and second conductive planes 100, 200. The first conductive plane 100 is shown in the front view and the second conductive plane 200 in the back view. On the first conductive plane 100 two traces are provided, that extend longitudinally. The traces form first ones of conductor elements 111, 121 of the first and second pairs 110, 120. Accordingly, on the second conductive plane 200 two traces are provided, that extend longitudinally. These traces form second ones of conductor elements 112, 122 of the first and second pairs 110, 120. The routing of those traces differs from the routing shown in FIG. 2A. Instead of using vias, the head end 111*h* of the first balanced conductor element 111 of the first pair 110 of balanced conductor elements is routed above the head end 121*h* of the first balanced conductor element 121 of the second pair 120 of balanced conductor elements.

It is to be understood, that the routing depicted in FIGS. 3A and 3B is only exem-plary. E.g. more slanted routing can also be provided, for routing the head end 111*h* of the first balanced conductor element 111 of the first pair 110 of balanced conductor elements above the head end 121*h* of the first balanced conductor element 121 of the second pair 120 of balanced conductor elements.

As shown in FIG. 3B, the head end 111*h* of the first balanced conductor element 111 of the first pair 110 of balanced conductor elements is galvanically connected to the first radiator arm 21*a* of the first radiator 21. The head end 112*h* of the second balanced conductor element 112 of the first pair 110 of balanced conductor elements is galvanically connected to the second radiator arm 21*b* of the first radiator 21. The first balanced conductor element 121 of the second pair 120 is connected to the first arm 22*a* of the second radiator and the second balanced conductor element 122 of the second pair 120 is connected to the second arm 22*b* of the second radiator 22 of the dual polarized radiator 20.

As becomes apparent from FIGS. 2B and 3B, the feeding structure may be formed on a single PCB 300 (here, the intermediate insulating layer 150 is not shown). Alternatively, the conductor elements 111, 112, 121, 122 can be formed of sheet metal and e.g. be stamped and bended to achieve the form shown in FIGS. 2B and 3B.

Figure 4:
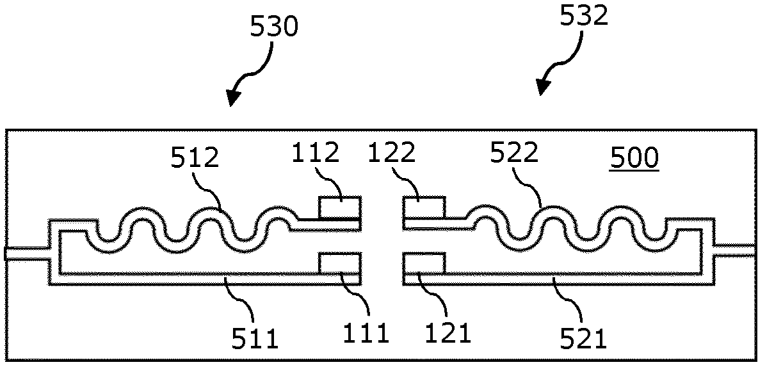
FIG. 4 shows a schematic illustration of a base plate of a feeding structure.

FIG. 4 shows a schematic illustration of a base plate 500 of a feeding structure 10. The base plate 500 is a base PCB that includes signal lines 511, 512, 521, 522. Those signal lines 511, 512, 521, 522 are galvanically connected to respective ones of the foot ends 111*f*, 112*f*; 121*f*, 122*f* of the balanced conductor elements 111, 112; 121, 122.

Here, the base plate 500 includes two balancing units 530, 532 assigned to the first and second pairs 110, 120, respectively. The balancing units 530, 532 are formed as a delay line type balun. The meander shape of the lines 512 and 522 lengthens the path of those lines compared to lines 511, 521 so that e.g. a 180° delay can be achieved in the respective signal lines. Hence, the length of line 522 may be λ/2 longer than the corresponding signal line 521. Accordingly, the length of line 512 may be λ/2 longer than the corresponding signal line 511, wherein λ denotes the wavelength of the radiator to be fed. As depicted in FIG. 4, the input(s) of the lines 512 and 511 (and of lines 521, 522, respectively) may be connected and can therefore operate as input to an asymmetrical line as, i.e. a microstrip line.

Figure 5:
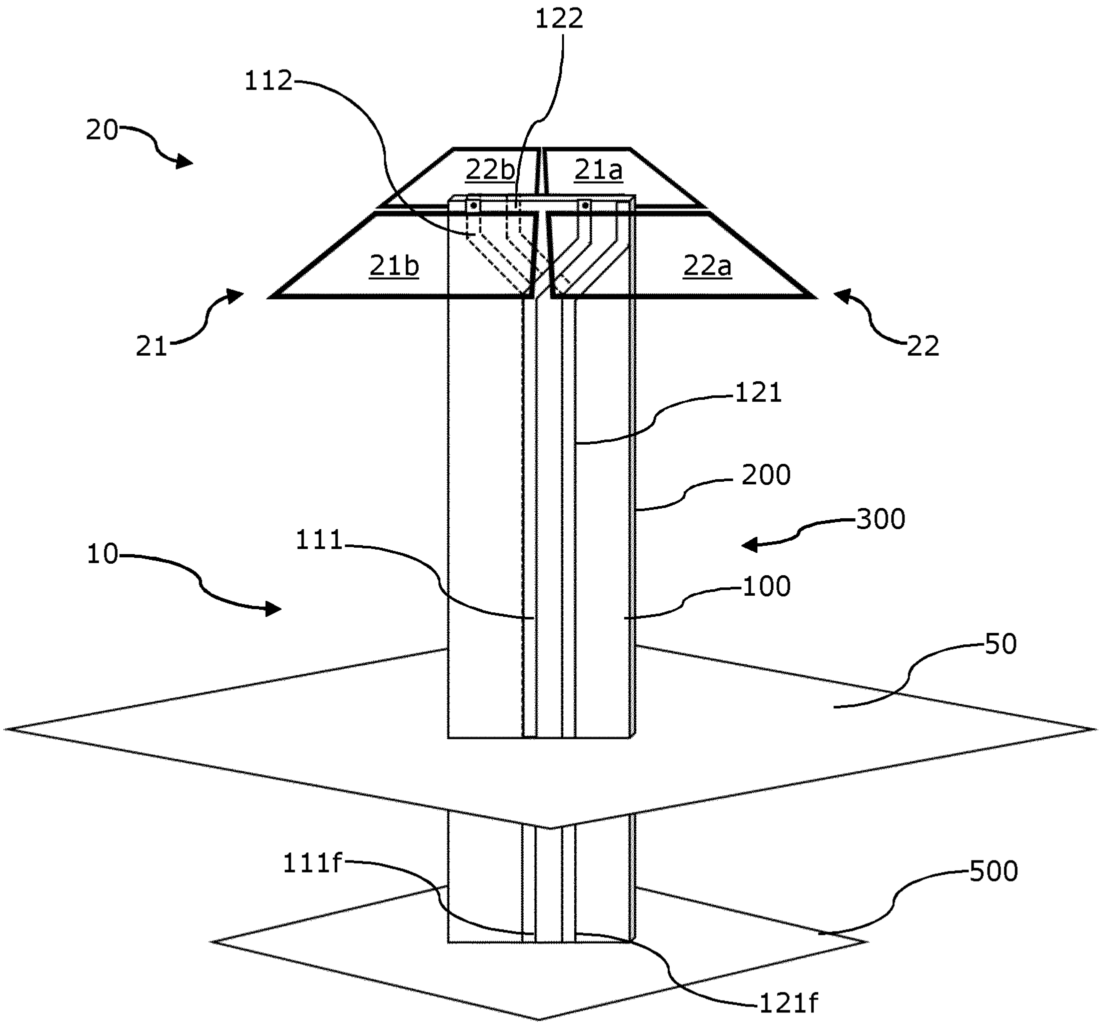
FIG. 5 shows a schematic illustration of a dual polarized radiator, including a feeding structure having a radiator.

FIG. 5 shows a schematic illustration of a dual polarized radiator 20, including a feeding structure 10 having a radiator 50. The setup of the dual polarized radiator 20 and the feeding structure 10 corresponds to the setup shown in FIG. 1. Addi-tionally, a radiator 50 is provided. The radiator 50 is separated from the base plate (PCB) 500, however could be integrally formed. The first and second pairs 110, 120 of balanced conductor elements 111, 112; 121, 122 penetrate the reflector 50, so that the respective foot ends 111*f*, 112*f*; 121*f*, 122*f* (and accordingly the base plate 500) and head ends 111*h*, 112*h*; 121*h*, 122*h* (and accordingly the dual polarized radiator 20) are arranged on opposing sides of the reflector 50.

Figure 6:
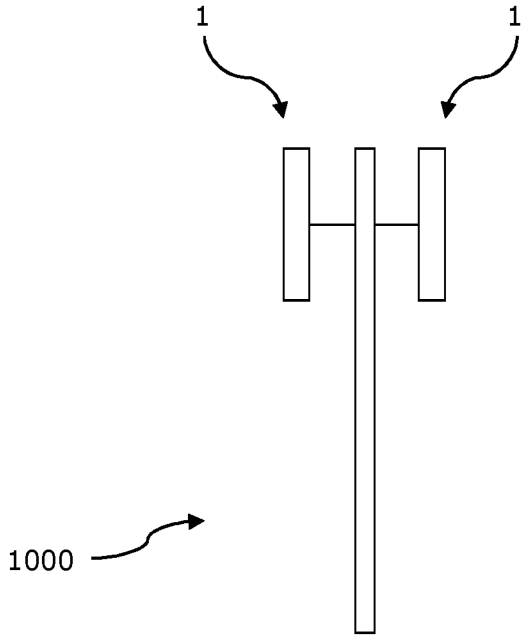
FIG. 6 shows a schematic illustration of a base station with multiple base station antennas.

FIG. 6 shows schematically a base station 1000 comprising two base station antennas 1, wherein each base station antenna may include a dual polarized radiator as explained above with respect to any one of FIGS. 1 to 5.

Some of the embodiments contemplated herein are described more fully with reference to the accompanying drawings. Other embodiments, however, are con-tained within the scope of the subject matter disclosed herein. The disclosed subject matter should not be construed as limited to only the embodiments set forth herein; rather, these embodiments are provided by way of example to convey the scope of the subject matter to those skilled in the art.

The present invention may, of course, be carried out in other ways than those specifically set forth herein without departing from essential characteristics of the invention. The present embodiments are to be considered in all respects as illus-trative and not restrictive, and all changes coming within the meaning and equiv-alency range of the appended claims are intended to be embraced therein.

LIST OF REFERENCE SIGNS

1 base station antenna
10 feeding structure
20 dual polarized radiator
21 first radiator
21*a* first radiator arm of first radiator
21*b* second radiator arm of first radiator
22 second radiator
22*a* first radiator arm of second radiator
22*b* second radiator arm of second radiator
50 reflector
100 first conductive plane
110 first pair
111 balanced conductor element
111*h* head end
111*f* foot end
111*p* connection pad
111*v* via
112 balanced conductor element
112*h* head end
112*f* foot end
112*p* connection pad
112*v* via
120 second pair
121 balanced conductor element
121*h* head end
121*f* foot end
122 balanced conductor element
122*h* head end
122*f* foot end
150 insulator layer
200 second conductive plane
300 PCB
500 base plate (PCB)
511 signal line
512 signal line
521 signal line
522 signal line
530 balancing unit
532 balancing unit
1000 base station

The invention claimed is:

1. A feeding structure for a dual polarized radiator, particularly for a base station antenna, the feeding structure comprising;

a first conductive plane and a second conductive plane, wherein the first conductive plane is substantially parallel to the second conductive plane;

the feeding structure further comprising:

a first pair of balanced conductor elements; and a second pair of balanced conductor elements;

wherein each of the balanced conductor elements of the first pair and the second pair includes a head end and a foot end, being opposed to the respective head end;

wherein the first pair of balanced conductor elements is adapted to being galvanically connected to a first radiator of a dual polarized radiator at the respective head ends of the balanced conductor elements of the first pair; and wherein the second pair of balanced conductor elements is adapted to being galvanically connected to a second radiator of the dual polarized radiator at the respective head ends of the balanced conductor elements of the second pair;

wherein a first balanced conductor element of the first pair of balanced conductor elements is arranged on the first conductive plane and a second balanced conductor element of the first pair of balanced conductor elements is arranged on the second conductive plane, so as to be broadside coupled with the first balanced conductor element of the first pair of balanced conductor elements; and wherein a first balanced conductor element of the second pair of balanced conductor elements is arranged on the first conductive plane and a second balanced conductor element of the second pair of balanced conductor elements; is arranged on the second conductive plane, so as to be broadside coupled with the first balanced conductor element of the second pair of balanced conductor elements.

2. The feeding structure according to claim 1, wherein the first balanced conductor element of the first pair of balanced conductor elements is arranged next to the first balanced conductor element of the second pair of balanced conductor elements, and optionally-runs parallel to the first balanced conductor element of the second pair of balanced conductor elements, at least in a certain section.

3. The feeding structure according to claim 1, wherein at least one of the first and/or second conductive planes is a conductive plane of a Printed Circuit Board (PCB), and wherein the first and second conductive planes; may be conductive planes of the same PCB.

4. The feeding structure according to claim 1, wherein at least one of the first and/or second conductive planes is a sheet metal plane.

5. The feeding structure according to claim 1, wherein the first and second conductive planes sandwich an insulator layer, wherein the first and second conductive planes are fixedly adhered to the insulator layer.

6. The feeding structure according to claim 1, wherein the conductor elements of the first pair and/or the second pair include a meander symmetrical line, wherein the conductor elements of the first pair and the conductor elements of the second pair may have an opposing meander shape.

7. The feeding structure according to claim 1, wherein;

the head ends of the balanced conductor elements are provided on the same side of a dual polarized radiator to be fed; and the head ends of the balanced conductor elements may be arranged on a side of a dual polarized radiator that faces away from the foot ends of the balanced conductor elements.

8. The feeding structure according to claim 1, wherein:

the head ends of the balanced conductor elements of the first pair are provided on a first side of a dual polarized radiator to be fed; and the head ends of the balanced conductor elements of the second pair are provided on a second side of a dual polarized radiator to be fed, opposing the first side.

9. The feeding structure according to claim 1, wherein:

the head end of the first balanced conductor element of the first pair of balanced conductor elements includes at least one via, connecting the first balanced conductor element with a corresponding connection pad arranged on the second conductive plane, that serves for galvanically connecting the head end to a first radiator arm of the first radiator; and/or the head end of the second balanced conductor element of the first pair of balanced conductor elements includes at least one via, connecting the second balanced conductor element with a corresponding connection pad arranged on the first conductive plane, that serves for galvanically connecting the head end to a second radiator arm of the first radiator.

10. The feeding structure according to claim 9, wherein the at least one via, and all vias assigned to the balanced conductor elements are arranged on a side of the dual polarized radiator to be fed, that faces away from the foot ends of the balanced conductor elements.

11. The feeding structure according to claim 1, wherein:

the head end of the first balanced conductor element of the first pair of balanced conductor elements is routed above the head end of the first balanced conductor element of the second pair of balanced conductor elements.

12. The feeding structure according to claim 1, wherein the head ends of the balanced conductor elements are adapted to be soldered, welded or plugged to respective radiators.

13. The feeding structure according to claim 1, further comprising a base plate, being particularly a base Printed Circuit Board (PCB), the base plate including signal lines being galvanically connected to respective ones of the foot ends of the balanced conductor elements.

14. The feeding structure according to claim 1, wherein the feeding structure further includes;

at least one balancing unit and/or a radio frequency (RF) choke for providing a balanced signal to the first and/or second pair of balanced conductor;

wherein the at least one balancing unit and/or RF choke may be arranged on the base plate and/or a Printed Circuit Board (PCB) carrying the balanced conductor elements.

15. The feeding structure according to claim 1, further comprising a reflector, being assigned to the radiators of the dual polarized radiator.

16. The feeding structure according to claim 15, wherein the reflector is integrally formed with the base plate.

17. The feeding structure according to claim 15, wherein the first and/or second pair of balanced conductor elements penetrates the reflector, so that the respective foot ends and head ends are arranged on opposing sides of the reflector.

18. A dual polarized radiator including a feeding structure, the feeding structure comprising:

a first conductive plane and a second conductive plane, wherein the first conductive plane is substantially parallel to the second conductive plane;

the feeding structure further comprising:

a first pair of balanced conductor elements; and a second pair of balanced conductor elements;

wherein each of the balanced conductor elements of the first pair and the second pair includes a head end and a foot end, being opposed to the respective head end;

wherein the first pair of balanced conductor elements is adapted to being galvanically connected to a first radiator of a dual polarized radiator at the respective head ends of the balanced conductor elements of the first pair; and wherein the second pair of balanced conductor elements is adapted to being galvanically connected to a second radiator of the dual polarized radiator at the respective head ends of the balanced conductor elements of the second pair;

wherein a first balanced conductor element of the first pair of balanced conductor elements is arranged on the first conductive plane and a second balanced conductor element of the first pair of balanced conductor elements is arranged on the second conductive plane, so as to be broadside coupled with the first balanced conductor element of the first pair of balanced conductor elements, wherein a first balanced conductor element of the second pair of balanced conductor elements is arranged on the first conductive plane and a second balanced conductor element of the second pair of balanced conductor elements is arranged on the second conductive plane, so as to be broadside coupled with the first balanced conductor element of the second pair of balanced conductor elements;

wherein the dual polarized radiator further includes:

a first radiator, particularly a first dipole, and a second radiator, particularly a second dipole;

wherein the first radiator is galvanically connected to the first pair of balanced conductor elements; and wherein the second radiator is galvanically connected to the second pair of balanced conductor elements.

19. The dual polarized radiator according to claim 18, wherein the first and second radiators are Printed Circuit Board (PCB) radiators or sheet metal radiators.

20. A base station antenna for wireless communication, the base station antenna including:

at least one dual polarized radiator including a feeding structure, the feeding structure comprising:

a first conductive plane and a second conductive plane, wherein the first conductive plane is substantially parallel to the second conductive plane;

the feeding structure further comprising:

a first pair of balanced conductor elements; and a second pair of balanced conductor elements;

wherein each of the balanced conductor elements of the first pair and the second pair includes a head end and a foot end, being opposed to the respective head end;

wherein the first pair of balanced conductor elements is adapted to being galvanically connected to a first radiator of a dual polarized radiator at the respective head ends of the balanced conductor elements of the first pair; and wherein the second pair of balanced conductor elements is adapted to being galvanically connected to a second radiator of the dual polarized radiator at the respective head ends of the balanced conductor elements of the second pair;

wherein a first balanced conductor element of the first pair of balanced conductor elements is arranged on the first conductive plane and a second balanced conductor element of the first pair of balanced conductor elements is arranged on the second conductive plane, so as to be broadside coupled with the first balanced conductor element of the first pair of balanced conductor elements;

wherein a first balanced conductor element of the second pair of balanced conductor elements is arranged on the first conductive plane and a second balanced conductor element of the second pair of balanced conductor elements is arranged on the second conductive plane, so as to be broadside coupled with the first balanced conductor element of the second pair of balanced conductor elements:

wherein the dual polarized radiator further includes:

a first radiator, particularly a first dipole, and a second radiator, particularly a second dipole;

wherein the first radiator is galvanically connected to the first pair of balanced conductor elements; and wherein the second radiator is galvanically connected to the second pair of balanced conductor elements; and wherein the base station further includes a phase shifter for adapting the beam direction of the base station antenna.

* * * * *